(12) United States Patent
Degen et al.

(10) Patent No.: US 11,231,846 B2
(45) Date of Patent: Jan. 25, 2022

(54) MONITOR AND CONTROL FOR DISTRIBUTED SYSTEM

(71) Applicant: Siemens Aktiengesellschaft, Munich (DE)

(72) Inventors: Heinrich Helmut Degen, Plainsboro, NJ (US); Siyu Zhao, Plainsboro, NJ (US); Yunsheng Zhou, Princeton, NJ (US); Michael Jaentsch, Princeton, NJ (US); Florian Ersch, Plainsboro, NJ (US); Yunhua Fu, Princeton, NJ (US); Tejashree Kate, Princeton, NJ (US); Ayushi Sachdeva, Lawrenceville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/193,457

(22) Filed: Mar. 5, 2021

(65) Prior Publication Data

US 2021/0278963 A1    Sep. 9, 2021

Related U.S. Application Data

(60) Provisional application No. 62/986,003, filed on Mar. 6, 2020.

(51) Int. Cl.
*G06F 3/0484* (2013.01)
*G06T 11/20* (2006.01)
(Continued)

(52) U.S. Cl.
CPC ........ *G06F 3/04847* (2013.01); *G06T 11/001* (2013.01); *G06T 11/206* (2013.01); *G06T 2200/24* (2013.01); *H04L 67/12* (2013.01)

(58) Field of Classification Search
CPC ................................................ G06F 3/04847
(Continued)

(56) References Cited

U.S. PATENT DOCUMENTS 8,650,492 B1 *  2/2014  Mui ..................... H04L 43/0829
                                                     715/736
9,021,361 B1 *  4/2015  Pettinati ................. G06Q 30/00
                                                     715/736

(Continued)

OTHER PUBLICATIONS

Tanenbaum, Andrew S.; Steen, Maarten van (2002). Distributed systems: principles and paradigms. Upper Saddle River, NJ: Pearson Prentice Hall ISBN 0-13-088893-1; 11 pages.

*Primary Examiner* — Reza Nabi

(57) ABSTRACT

Methods, systems, and apparatuses are described that can encode connection information between consumers and providers for displaying to users. In an example aspect, a distributed control system includes a production network configured to perform automated control operation. The production network can include one or more data extraction nodes and a plurality of devices in communication with the data extraction nodes. The data extraction nodes are configured to collect data from the plurality of devices. The data indicates connection information associated with the plurality of devices. The system can further include a screen configured to display a plurality of interfaces that include the plurality of devices represented as consumers and providers. In some cases, the screen defines a single desktop monitor or a mobile device display.

18 Claims, 7 Drawing Sheets

(51) Int. Cl.
*G06T 11/00* (2006.01)
*H04L 29/08* (2006.01)

(58) Field of Classification Search
USPC .......................................................... 715/736
See application file for complete search history.

(56) References Cited

U.S. PATENT DOCUMENTS

| | | | |
|---|---|---|---|
| 10,251,144 B2* | 4/2019 | Blaser | G06Q 10/087 |
| 10,728,868 B2* | 7/2020 | Blaser | G06Q 20/206 |
| 11,109,335 B2* | 8/2021 | Blaser | G06Q 10/087 |
| 2005/0113021 A1* | 5/2005 | Gosieski, Jr. | H04M 1/6066 |
| | | | 455/3.06 |
| 2010/0084276 A1* | 4/2010 | Lindsay | G01N 27/3276 |
| | | | 205/93 |
| 2011/0265698 A1* | 11/2011 | Hirson | F01K 25/00 |
| | | | 110/345 |
| 2015/0010935 A1* | 1/2015 | Lindsay | G01N 33/48721 |
| | | | 435/23 |
| 2015/0142154 A1* | 5/2015 | Tiano | G05B 19/4065 |
| | | | 700/109 |
| 2015/0301698 A1* | 10/2015 | Roques | G06F 3/0482 |
| | | | 715/736 |
| 2016/0356125 A1* | 12/2016 | Bello | G06Q 10/067 |
| 2017/0052536 A1* | 2/2017 | Warner | G06Q 50/06 |
| 2017/0171235 A1* | 6/2017 | Mulchandani | H04L 63/1433 |
| 2019/0219993 A1* | 7/2019 | Jin | G06Q 50/10 |

\* cited by examiner

MONITOR AND CONTROL FOR DISTRIBUTED SYSTEM

BACKGROUND

A distributed system generally refers to a system having components that are located on different networked computers, which communicate and coordinate their actions by passing messages to one another. A given distributed system can be very large with many components. In some cases, a given component is a provider of messages to other components, and a receiver of messages from other components. In such configurations, the number of bidirectional connections for n components can be computed as:

$$\text{Number of bidirectional communication path } (n) = 2 \cdot \frac{n(n-1)}{2} = n^2 - n.$$

A distributed system typically consists of hardware components, software components, and firmware. Hardware components and firmware can be assigned to physical locations. A software component can be deployed on computer hardware that is assigned to a location, and/or may provide a service to a virtual software component that is not allocated to a physical location. Generally distributed systems provide well-defined services. To provide such services, many distributed systems employ an operator who monitors and controls the performance of the distributed system. The general intent of the operator is often to maximize the system's uptime and to respond to abnormal situations (e.g. alerts, alarms) in a timely manner. With respect to abnormal situations, in some cases, a root cause and an effective corrective action need to be identified, and the corrective action needs to be properly executed to get the system back to a normal system's status.

It is recognized herein that the cognitive load for a human operator to monitor and control a complex distributed system can be significant for various reasons, such as those mentioned above. For example, some distributed systems can include many system components and many bidirectional connections. Generally, the cognitive load for an operator increases as the number of components and connections increase. By way of example, when an abnormal situation arises in a given distributed system, the operator may need to determine the location associated with the abnormal situation in order to address the situation. Such a determination can be complicated by the number of components or size of the distributed system. Further, it is recognized herein that comparisons between the states and behaviors of different system components can also increase the cognitive load for an operator even if system components are grouped into groups of components (e.g. subsystems), which can result in reduced efficiency for the operator to identify and diagnose an abnormal situation.

As described above, it is recognized herein that various complexities involved in monitoring and controlling distributed systems can create cognitive burdens for an operator. It is also recognized herein that increased size and complexities of systems can reduce screen real estate that is available to present or display information to operators. For example, as systems increase in size, there is often a need to present more information to operators, but there might not be enough display space to usefully present such information. Thus, it is recognized herein that the amount and complexity of information that is displayed to operators can result in mistakes or other technical issues (e.g., screen real estate issues) associated with monitoring and controlling a given distributed system.

BRIEF SUMMARY

Embodiments of the invention address and overcome one or more of the described-herein shortcomings by providing methods, systems, and apparatuses that encode connection information between consumers and providers for displaying to users. In an example aspect, a distributed control system includes a production network configured to perform automated control operation. The production network can include one or more data extraction nodes and a plurality of devices in communication with the data extraction nodes. The data extraction nodes are configured to collect data from the plurality of devices. The data indicates connection information associated with the plurality of devices. The system can further include a screen configured to display a plurality of interfaces that include the plurality of devices represented as consumers and providers. In some cases, the screen defines a single desktop monitor or a mobile device display. The distributed system further includes a processor and a memory storing instructions that, when executed by the processor, cause the processor to encode the connection information so as to define encoded connection information that indicates one or more properties associated with connections defined between respective providers and respective consumers. The screen is further configured to display the encoded connection information between respective consumers and providers. In some examples, the screen is further configured to display the encoded connection information as lines that connect providers with consumers that are associated with respective encoded connection information.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
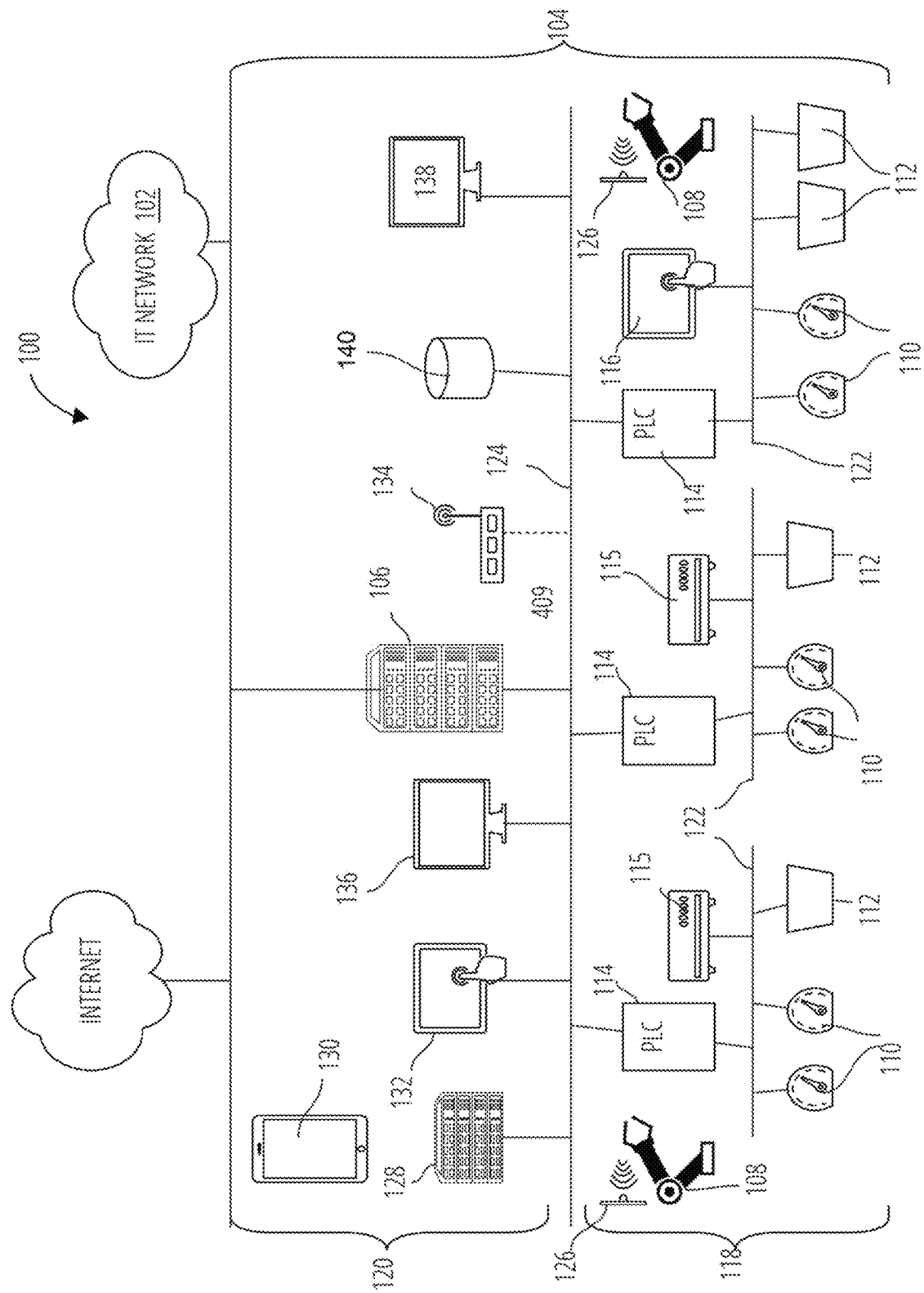
FIG. 1 is a block diagram of an example distributed control system in accordance with an example embodiment.

As an initial matter, distributed systems described herein can be implemented in various domains. Example domains for distributed systems include, without limitation, manufacturing systems, IT systems (e.g., including microservices), digital ecosystems (e.g., online marketplaces), social media systems, messaging and news systems, design and engineering systems, cloud services, energy generation systems, energy distribution systems, or the like.

As described herein, the size and complexity of a given distributed system can create issues for operators tasked with monitoring and controlling such systems. In various example embodiments, to address such issues, a distributed system defines a display that is configured to display specific information associated with respective normal and abnormal situations. The specific information can include relevant information that enables an operator to understand the normal or abnormal situation associated with the relevant information. The specific information can also define reduced information as compared to aggregate information that can displayed. Presenting reduced information can limit distractions for an operator by removing information deemed to be irrelevant to the situation at-issue. Further, the specific information can include contextual information (e.g., location, circumstance, etc.) associated with the respective situation, such that specific information can define rich information.

By way of example, operators can be informed of a situation in a given distributed system by displaying, among other information, system elements, connections between system elements, and indications concerning the usage flow of established connections. Displaying such information, however, can result in an overly cluttered display or can be infeasible due to limited screen real estate. Increasing screen real estate as information increases can also result in impractical or infeasible display sizes or numbers of display monitors. According to Hick-Hyman law (T=b $\log_2(n+1)$, n is number of information items; b is a constant), the time it takes to make a decision depends on the number of presented information items to the user. Thus, in some cases, it is recognized herein that the larger the screen real estate, the more information items are displayed, the longer it takes for the user to make decisions. It is further recognized herein that this dependency can be counterproductive for making timely responses in case of abnormal situations, among others. It is also recognized herein that operators may use mobile devices to access information related to distributed system and provide timely responses, and that such devices define a relatively small screen real estate.

Various technical issues are presented when trying to generate an interaction pattern that is domain-agnostic and that can be used to display relevant, reduced, and rich information on limited screen real estate. For example, an operator may need to navigate within a given distributed system to understand the contribution of a group of system elements, or individual system elements, to the distributed system. By way of another example, an operator may need to navigate within a given distributed system for state visualization. In particular, an operator may need to understand the current and historical contribution of a group of system elements, or individual elements, to the system behavior. Similarly, a display may need to render connection and usage information so as to enable an operator to visualize or understand the connection (e.g., connection status, connection use) between two or more system elements. By way of yet another example, a display may need to render information so as to enable an operator to visualize or understand an abnormal situation.

Current approaches to displaying information for operations related to a distributed system typically rely on multiple monitors that display a plethora of information. For example, to provide context information for the information items of a distributed system, the system information is typically displayed in a physical view in which the system elements are organized in a system topology that resembles the physical structure and location of the installed system. A problem with this approach, among others, is that it requires a large display. Furthermore, the information associated with each system element is displayed in the topology context, which makes it difficult to use smaller real estate for the display of the distributed system and its status information. Further still, current approaches typically define a visualization of the system elements that is domain-specific and use-case specific. Thus, in some cases, operators need to be retrained when switching operations from one domain to another.

In various embodiments described herein, an interaction pattern is defined that enables a distributed system to display, for instance on a mobile device or other computing device having limited screen real estate, a limited number of information items concerning system elements and currents uses of the distributed system. Example items that can be displayed in a domain-agnostic manner include, without limitation, status information (e.g., normal and abnormal states) and information concerning system elements, connections, and connection use. Using the displayed information, an operator can effectively monitor a given distributed system and respond a timely manner.

Referring initially to FIG. 1, an example distributed control system (DCS) defines an industrial control system (ICS) 100 that includes an office or corporate IT network 102 and an operational plant or production network 104 communicatively coupled to the IT network 102. It will be understood that the ICS 100 is illustrated and simplified as an example, and distributed systems can define other systems in other domains having other configurations, and all such distributed systems are contemplated as being within the scope of this disclosure. For example, embodiments of the distributed control system can define an operational technology system, energy generation system (e.g., wind parks, solar parks, etc.), or an energy distribution network. 1 should also list OT (Operational Technology).

The production network 104 can include an abstraction engine 106 that is connected to the IT network 102. The production network 104 can include various production machines configured to work together to perform one or more manufacturing operations. Example production machines of the production network 104 can include, without limitation, robots 108 and other field devices, such as sensors 110, actuators 112, or other machines, which can be controlled by a respective PLC 114. The PLC 114 can send instructions to respective field devices. In some cases, a given PLC 114 can be coupled to one or more human machine interfaces (HMIs) 116.

The ICS 100, in particular the production network 104, can define a fieldbus portion 118 and an Ethernet portion 120. For example, the fieldbus portion 118 can include the robots 108, PLC 114, sensors 110, actuators 112, and HMIs 116. The fieldbus portion 118 can define one or more production cells or control zones. The fieldbus portion 118 can further include a data extraction node 115 that can be configured to communicate with a given PLC 114 and sensors 110. In some cases, the PLC 114 can define the data extraction node 115. For example, the data extraction node 115 can run as an application or service on the PLC 114. Alternatively, the data extraction node 115 can run as an application or service on a stand-alone ruggedized personal computer or can be integrated with existing servers that can be close to, and coupled with, PLCs 114. The data extraction nodes 115 can be configured to trace communication as messages and information is transmitted within the ICS 100. Such communication and data associated with the communication connections can be displayed to user, for instance via the interfaces depicted in FIGS. 2-6 that are further described herein.

The PLC 114, data extraction node 115, sensors 110, actuators 112, and HMI 116 within a given production cell can communicate with each other via a respective field bus 122. Each control zone can be defined by a respective PLC 114, such that the PLC 114, and thus the corresponding control zone, can connect to the Ethernet portion 120 via an Ethernet connection 124. The robots 108 can be configured to communicate with other devices within the fieldbus portion 118 via a WiFi connection 126. Similarly, the robots 108 can communicate with the Ethernet portion 120, in particular a Supervisory Control and Data Acquisition (SCADA) server 128, via the WiFi connection 126. The Ethernet portion 120 of the production network 104 can include various computing devices communicatively coupled together via the Ethernet connection 124. Example computing devices in the Ethernet portion 120 include, without limitation, a mobile data collector 130, HMIs 132, the SCADA server 128, the abstraction engine 106, a wireless router 134, a manufacturing execution system (MES) 136, an engineering system (ES) 138, and a log server 140. The ES 138 can include one or more engineering workstations. In an example, the MES 136, HMIs 132, ES 138, and log server 140 are connected to the production network 104 directly. The wireless router 134 can also connect to the production network 104 directly. Thus, in some cases, mobile users, for instance the mobile data collector 130 and robots 108, can connect to the production network 104 via the wireless router 134. In some cases, by way of example, the ES 138 and the mobile data collector 130 define guest devices that are allowed to connect to the abstraction engine 106. The abstraction engine 106 can be configured to trace communication between the IT network 102 and the production network 106 and within the production network 106 itself, so that communication and data associated with the communication connections can be displayed to user, for instance via the interfaces depicted in FIGS. 2-6 that are further described herein. It will be understood that guest devices to the production network 104 can vary as desired.

With continuing reference to FIG. 1, data or information can be collected by the ICS 100, in particular the sensors 110 and the data extraction node 115. In some examples, the sensors 110 include OS-based sensors that can be deployed on the OS where the SCADA server 128 application is deployed. The sensors 110 can also include OS-based sensors for engineering workstations (e.g., of the MES 136 and ES 138) or HMIs 132 and 116. Alternatively, or additionally, the sensors 110 can be embedded on PLCs 114 so as to define embedded PLC-based sensors. In some cases, the sensors 110 perform listening only, so as to define passive network-based sensors that can extract data associated with consequences of user interactions. Alternatively, or additionally, the sensors 110 can perform polling so as to define active network-based sensors. Such active sensors can query given devices to collect data such as, for example, the latest operations performed by users of the devices. Thus, ICS 100 can include a PLC (and/or other devices) and a data collecting application configured to run on the PLC (and/or other devices). The data collecting application can be further configured to collected data associated with the PLC, or associated with other devices on which it runs.

Example users of the ICS 100 include, for example and without limitation, operators of an industrial plant or engineers that can update the control logic of a plant. By way of an example, an operator can interact with the HMIs 132, which may be located in a control room of a given plant. Alternatively, or additionally, an operator can interact with HMIs of the ICS 100 that are located remotely from the production network 104. Similarly, for example, engineers can use the HMIs 116 that can be located in an engineering room of the ICS 100. Alternatively, or additionally, an engineer can interact with HMIs of the ICS 100 that are located remotely from the production network 104.

In some examples, the ICS 100 includes a management system that includes a user interface. The user interface can be configured to visually or audibly render alerts. The user interface can also be configured to receive commands, such that, for example, a security team can visualize alerts and/or investigate anomalies. In an example, the management system further includes a data export interface configured to send the data that is collected to a commercial security information and event management systems (SIEM).

Figure 2:
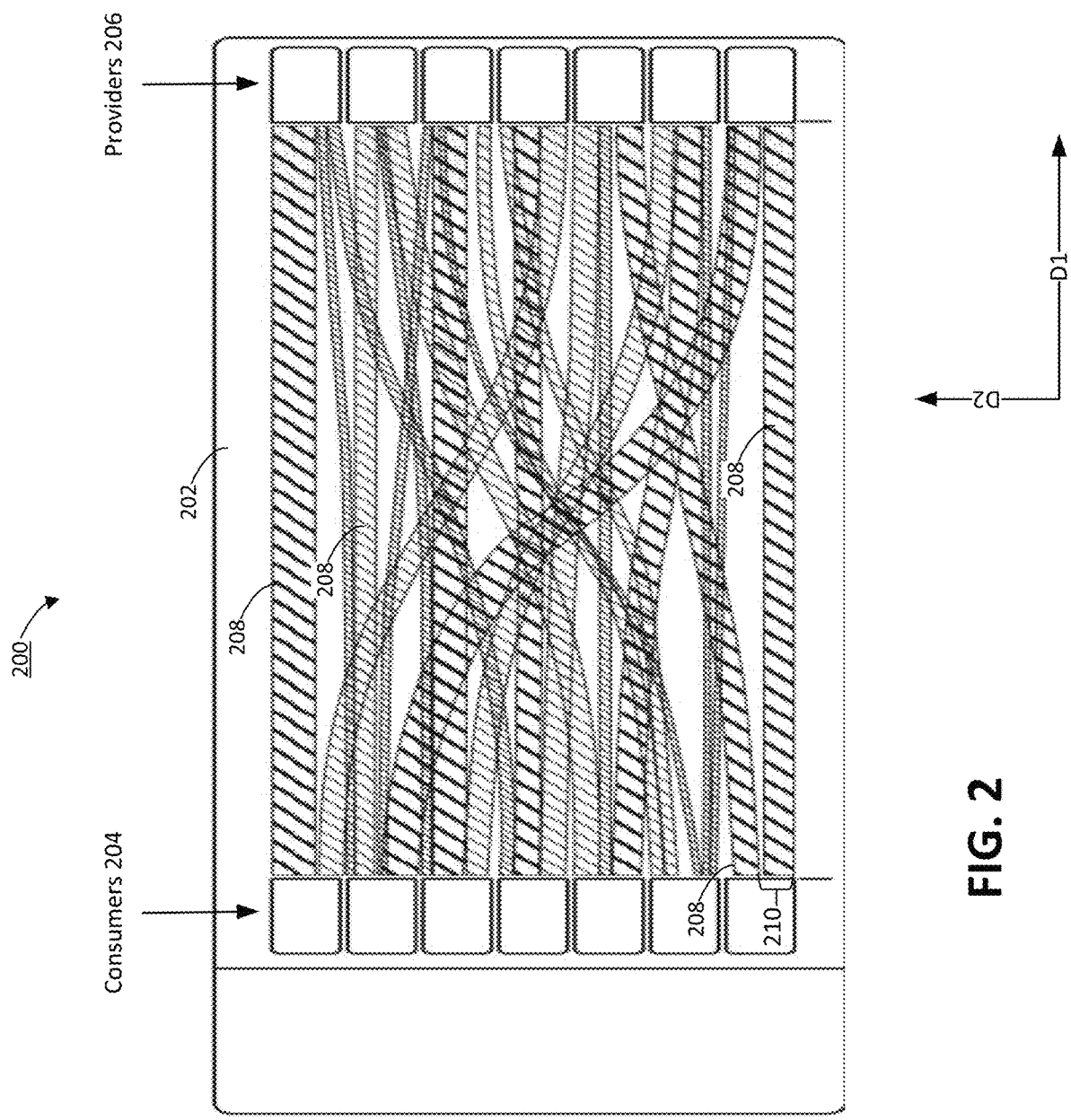
FIG. 2 is an example interface for monitoring distributed control systems in accordance with an example embodiment.

Referring also to FIG. 2, an example interface 200 can be displayed by the management system or by various displays within the ICS 100. By way of example, and without limitation, the MES 136, HMIs 132, ES 138, and the mobile data collector 130 can be configured to display information for monitoring and controlling a distributed system. In particular, for example, the MES 136, HMIs 132, ES 138, and the mobile data collector 130 can be configured to display the interface 200.

Referring in particular to FIG. 2, the example interface 200 can define various views that can be presented at the same time on the same interface, or at different times. The views can be connected, such that a selection in one view affects a change in another view in accordance with the selection. The example interface 200 includes an example Sankey view 202, though it will be understood that the example interface 200 may include additional views as desired, such as a logical view or timeline view. The Sankey view 202 includes elements of the ICS 100 (system elements). Any node or machine of the ICS 100 can be considered a system element. Each system element defines a consumer 204 or provider 206. The consumers 204 can send information to the providers 206. Based on the information, the providers 206 can provide a service that the consumers 204 can use or consume. The Sankey view 202 can illustrate various connections 208 between system elements, for instance between consumers 204 and providers 206. The connections 208 can be displayed so as provide a user with various information, such as, for example and without limitation: which system elements are connected with one another; the type of connection between given system elements; and usage information related to the connection between specific system elements. By way of further example, with respect to a particular connection, the interface 200, for instance the Sankey view 202, may indicate the system entities that are connected, a connection ID, the time when the connection was established, a time for disconnecting a connection, the type of connection, and the like. Usage information may include, for example, data type that is sent, data type that is received, sending time, receiving time, a number of data at the sender and/or at the receiver, frequency intensity of a connection, age of a connection, status associated with a connection (e.g., disconnected or connected), elapsed time since a disconnection, throughput associated with a connection, state of a connection (e.g., normal states, abnormal states, error state, warning state), or the like. Further, with respect to a connection that defines an abnormal state, the Sankey view 202 may indicate an error, an occurrence time of the error, an error type, the connection ID associated with the error, or the like.

In various embodiments, connections that are displayed define various visual encodings for a user. In particular, by viewing the visual characteristics of the connections 208 on a display, a user can ascertain various properties of the connections 208, and thus of the ICS 100. For example, a given connection 208 between two system elements (e.g., a consumer and provider) can define a thickness 210. In some examples, the representation of the consumers 204 on the interface 200 are spaced from the representation of the providers 206 along a first or lateral direction D1, and the thickness 210 can be defined along a second or transverse direction D2 that is substantially perpendicular to the lateral direction, though it will be understood that the representations of consumers and providers can be alternatively arranged as desired. In an example, referring also to FIG. 6, the thickness 210 can encode the number of connections between two respective system elements. In some cases, as the number of connections increases between a given consumer and provider, the thickness 210 of the respective connection 208 increases between the given consumer and provider. For example, referring to FIG. 6, example visual encodings 600 associated with connections are shown. In particular, example thickness connection encodings 602 are shown. In an example, a first connection encoding 602a defines a first thickness that is less than a second thickness defined by a second connection encoding 602b, which is less than a third thickness defined by a third encoding 602c. Thus, in accordance with the example, system elements that are displayed as coupled together with the first connection encoding 602a have less connections than system elements that are displayed as coupled together with the second connection encoding 602b, which has less connections than system elements that are displayed as coupled together with a third connection encoding 602c. It will be understood that any number of thickness connection encodings can be displayed to encode additional numbers of connections or alterative characteristics or properties of connections 208, and all such connection encodings are contemplated as being within the scope of this disclosure.

Figure 6:
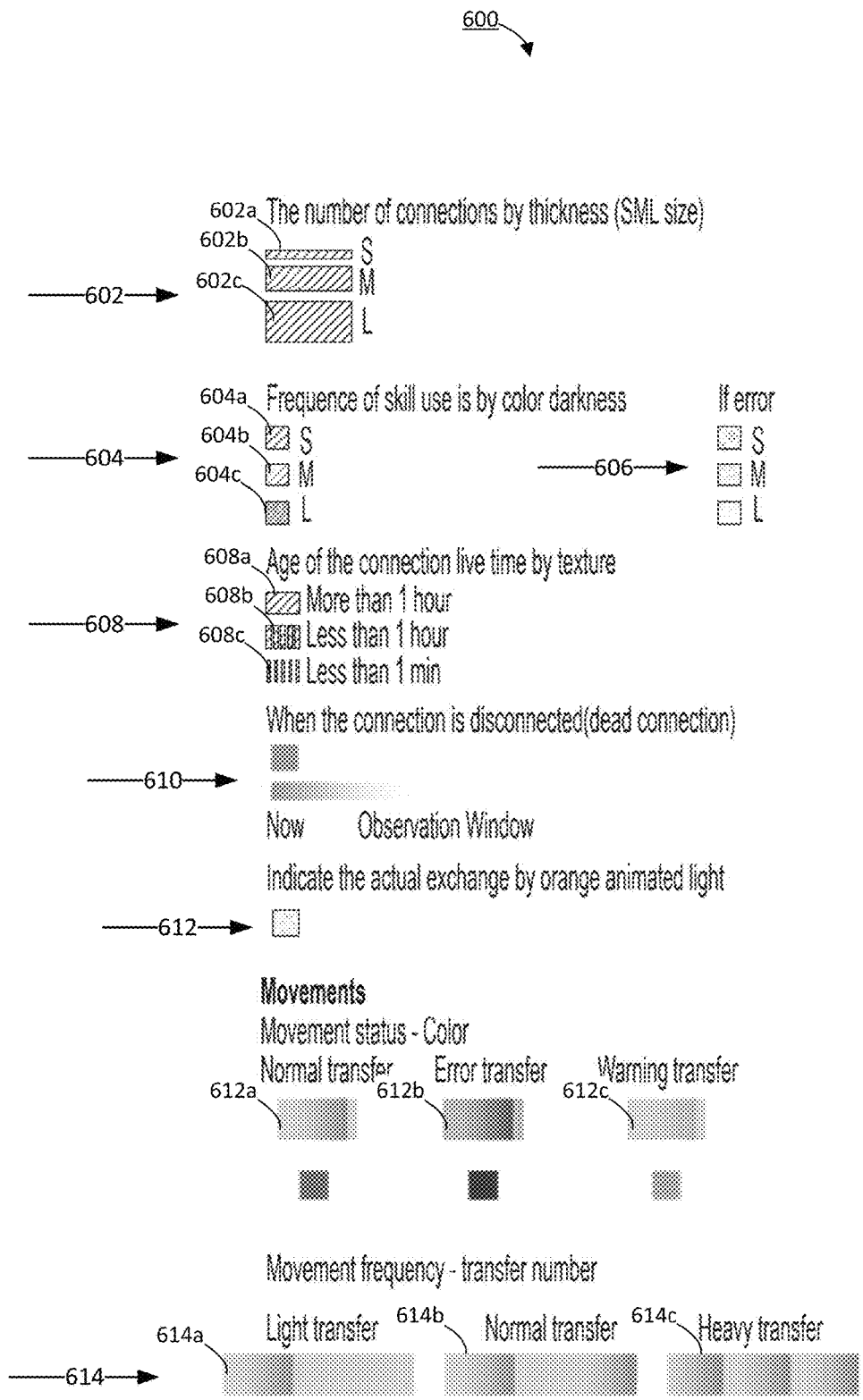
FIG. 6 depicts various connection encodings that can be display by various interfaces in accordance with embodiments described herein, such as the interfaces depicted in FIGS. 2-5.

With continuing reference to FIG. 6, color or shading can also encode various properties of connections within the ICS 100, so that a user can easily identify such properties. For example, a given connection 208 between two system elements can define a shade, color, pattern, or the like. In some cases, the frequency of skill use, or the frequency in which a particular consumer uses a skill or service provided by a particular provider, is indicated to a user by various color hue connection encodings 604. In some cases, as the frequency of use increases between a given consumer and provider, the color hue connection encoding 604 of the respective connection 208 between the given consumer and provider darkens. For example, a first color connection encoding 604a defines a first hue that is lighter than a second hue defined by a second color connection encoding 604b, which is lighter than a second hue defined by a third color connection encoding 604c. Thus, in accordance with the example, system elements that are displayed as coupled together with the first color connection encoding 604a are used less frequently than system elements that are displayed as coupled together with the second color connection encoding 604b, which is used less frequently than system elements that are displayed as coupled together with a third color connection encoding 604c. It will be understood that any number of colors, hues or patterns, can be displayed to encode additional frequencies associated with connections or alterative characteristics or properties of connections 208, and all such color connection encodings are contemplated as being within the scope of this disclosure. For example, the visual encodings 600 may include various error connection encodings 606 that indicate an error associated with the respective connection. The color or pattern defined by the error connection encoding may vary depending on the severity of the error or the like.

Still referring to FIG. 6, texture or segmentation can also encode various properties of connections within the ICS 100, so that a user can easily identify such properties. For example, a given connection 208 between two system elements can define a segmented pattern. In some cases, the age of a particular connection is indicated to a user by various segmented pattern encodings 608. In an example, as the age of connection between a given consumer and provider increases, the segmented pattern encoding 608 of the respective connection 208 between the given consumer and provider includes less or longer segments. The segments can define a length along the first or lateral direction that is substantially perpendicular to the thickness 210 of the segment. For example, a first segmented pattern encoding 608a defines segments having a longer length than segments defined by a second segmented pattern encoding 608b, which defines segments having a longer length than segments defined by a third segmented pattern encoding 608c. In accordance with an example, system elements that are displayed as coupled together with the first segmented pattern encoding 608a have been connected greater than one hour, or longer than system elements have been connected that are displayed as coupled together with the second segmented pattern encoding 608b (e.g., less than one hour), which has been connected longer than system elements that are displayed as coupled together with a third segmented pattern encoding 608c (e.g., less than one minute). It will be understood that any number of segments having any number of lengths can be displayed to encode additional or alternative connection ages or time periods, or alterative connection properties, and all such segmented connection encodings are contemplated as being within the scope of this disclosure.

In some examples, the visual encodings 600 may include various dead connection encodings 610 that indicate a connection that was previously active is no longer active or is disconnected. The color (shading) or pattern defined by the dead connection encoding 610 may vary depending on the length of time that the connection has been inactive or the like. Similarly, the visual encodings 600 may include various active connection encodings 612 to indicate that a transfer is occurring over the respective connection. In an example, the active connection encoding 612 defines an orange or bright color, though it will be understood that the color of active connection encodings can vary as desired. For example, a first active connection encoding 612a can include a first color that indicates a normal transfer, a second active connection encoding 612b can include a second color that indicates an error in the respective transfer, and a third active connection encoding 612c can include a third color that indicates a warning associated with the respective transfer. In some cases, a warning defines a less critical anomaly as compared to an error. For example, a warning might not require an immediate operation intervention, whereas an error might require an intervention to resolve. A warning can include an indication of a future potential occurrence (e.g., a consumable needs to refilled within a certain time period or else production may stop). In contrast, an error indication may lead to a stop in production, which may require an immediate operator intervention.

Referring again to FIG. 6, movement of the displayed representation of a connection can also encode various properties of connections within the ICS 100, so that a user can easily identify such properties. For example, a given connection 208 between two system elements can define movement in the direction of the transfer of data, for instance from the consumer toward the provider or the from provider toward the consumer. In some cases, the status and frequency of a particular transfer is indicated to a user by various movement pattern encodings 614. In an example, as the frequency of an active transfer increases between a given consumer and provider, the movement pattern encoding 614 of the respective connection 208 between the given consumer and provider defines more movement or shading gradients. For example, a first active movement pattern encoding 614a defines less movement or shading gradients than movement or shading gradients defined by a second active movement pattern encoding 614b, which defines less movement or shading gradients than movement or shading gradients defined by a third active movement pattern encoding 614c. In accordance with an example, system elements that are displayed as coupled together with the first active movement pattern encoding 614a (e.g., light transfer) have less data being transferred than system elements that are displayed as coupled together with the second active movement pattern encoding 614b (e.g., normal transfer), which has less data being transferred than system elements that are displayed as coupled together with the third active movement pattern encoding 614c (e.g., heavy transfer). It will be understood that any active movement patterns can be displayed to encode additional or alternative transfer frequencies, or alterative connection properties, and all such active movement pattern encodings are contemplated as being within the scope of this disclosure.

Figure 3:
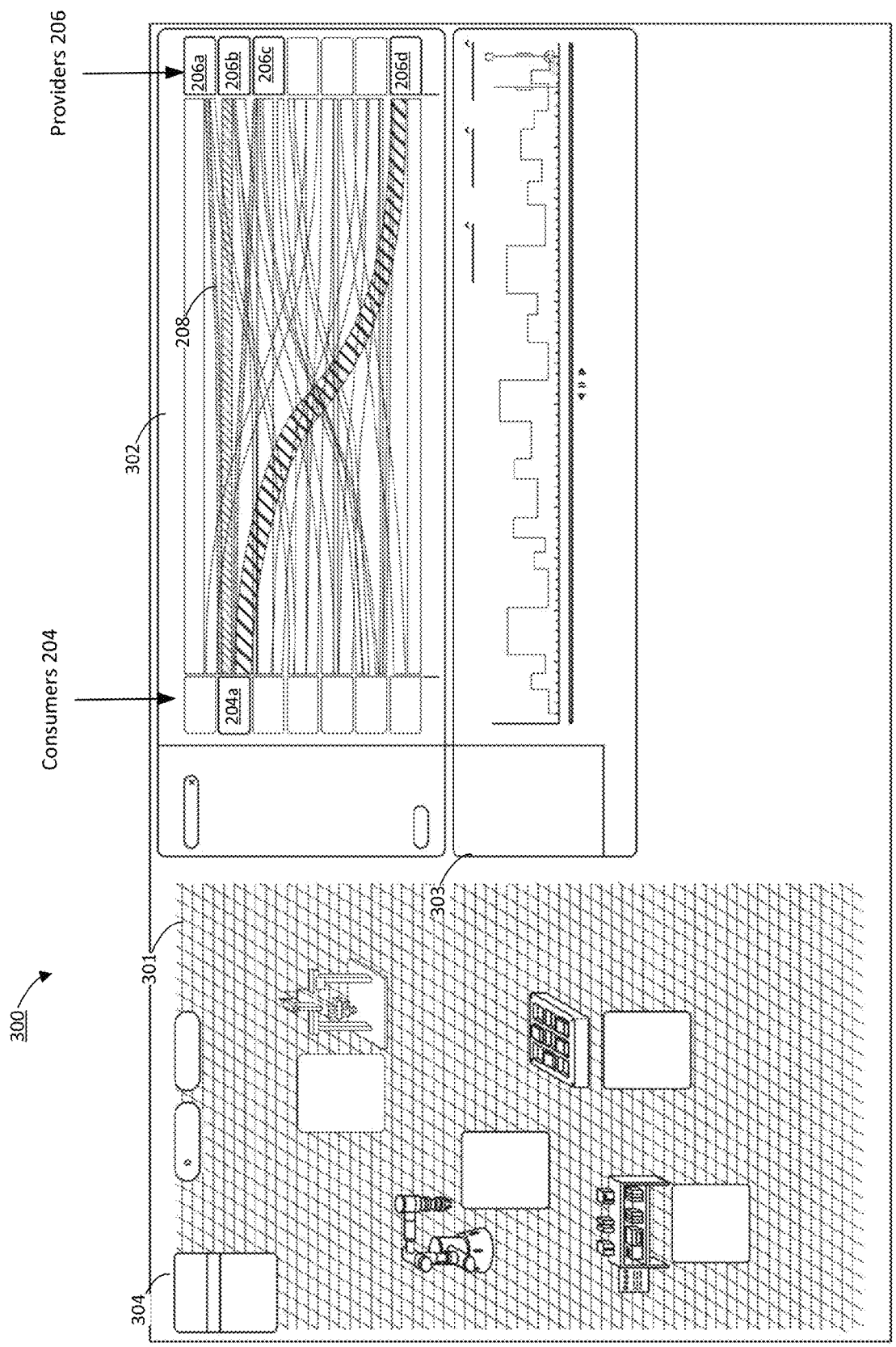
FIG. 3 depicts another example interface in which a particular consumer is selected from the interface shown in FIG. 2, in accordance with an example embodiment.

Referring to FIG. 3, another example interface 300 defines a logical view 301, a timeline view 303, and a Sankey view 302 that represents a portion of the Sankey view 202. The Sankey view 302 shows the connections from a select consumer 204a, which include a first provider 206a, a second provider 206b, a third provider 206c, and a fourth provider 206d. In various examples, the user can select a consumer 204 or provider 206 via the interfaces 200. For example, the user can select the consumer 204a from the logical view 301, in particular a pull down menu 304 on the logical view 301. Such a selection can automatically change the Sankey view 302 and the timeline view 303. For example, the selection of the consumer 204a on the logical view 301 can result in the consumer 204a and its associated connections 208 in the Sankey view 302 being highlighted or shown individually. Similarly, a selection in the Sankey view 302 of particular consumers or provides can result in the selected consumers or providers and associated data being heighted or shown in the logical view 301 and timeline view 303. Thus, the various views of a particular interface can be dependent upon another.

The selections can be made via pull down menu or other actuation defined by the interfaces. For example, responsive to the consumer 204a being selected via the interface 200, the connections that involve the consumer 204a are presented in bold via the interface, in particular the view 302. In some cases, responsive to the consumer 204a being selected via the interface 200, only the connections that involve the consumer 204a are presented via the interface 300, such that no other connections are displayed. The user can use the interface 300 to select alternative or additional consumers or providers.

Figure 4:
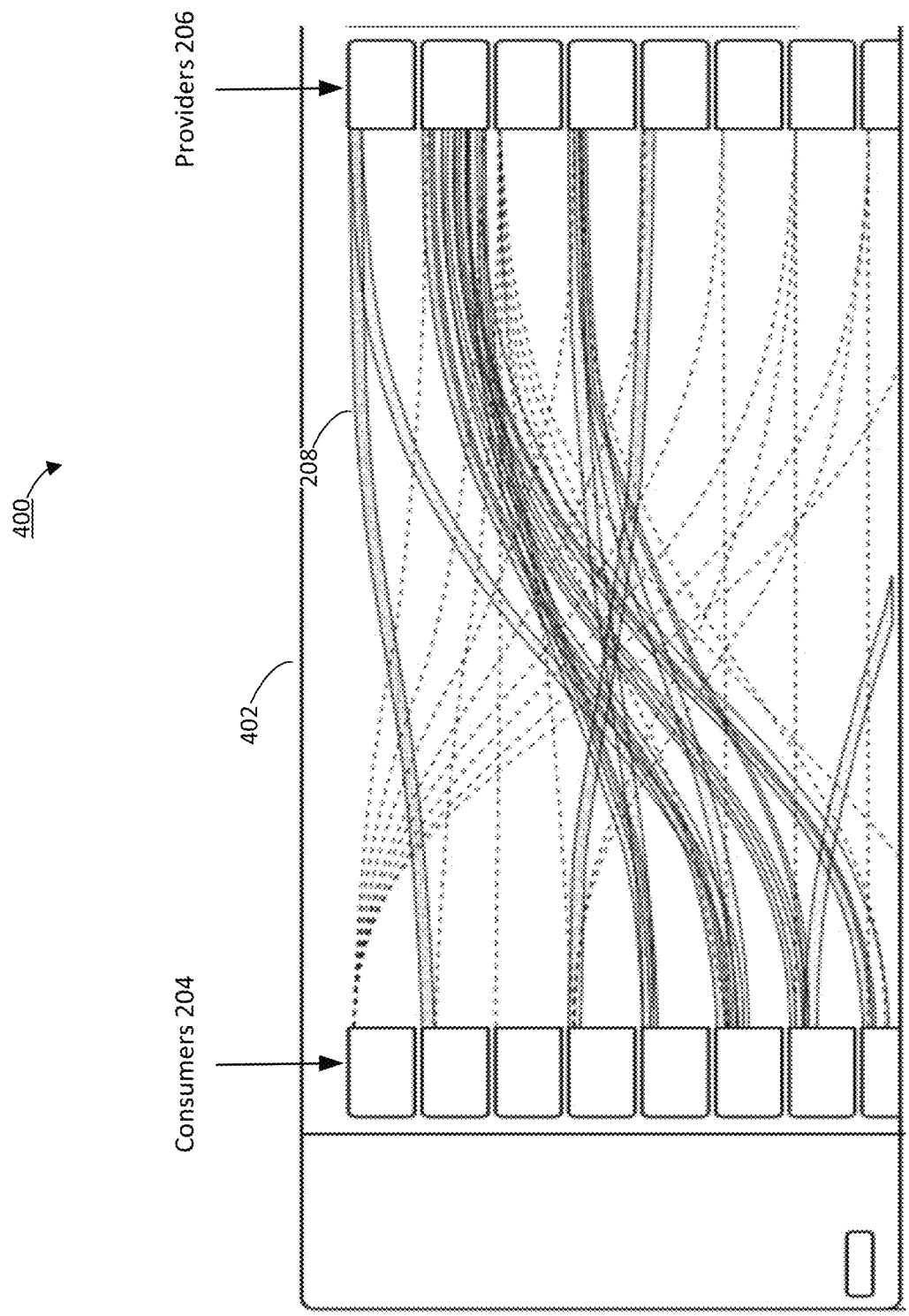
FIG. 4 depicts an example interface for monitoring distributed control systems, wherein a plurality of consumers or providers are grouped together, in accordance with an example embodiment.

Referring now to FIG. 4, in accordance with some embodiments, communicating entities can be grouped together. Such grouping can further enable communicating entities to be displayed on a screen having limited size, such as a desktop monitor, tablet, or mobile phone. An example interface 400 defines a Sankey view 402 in which two groups are aggregated and visualized, though it will be understood that groups can alternatively be constructed, and such groups are contemplated as being within the scope of this disclosure.

Figure 5:
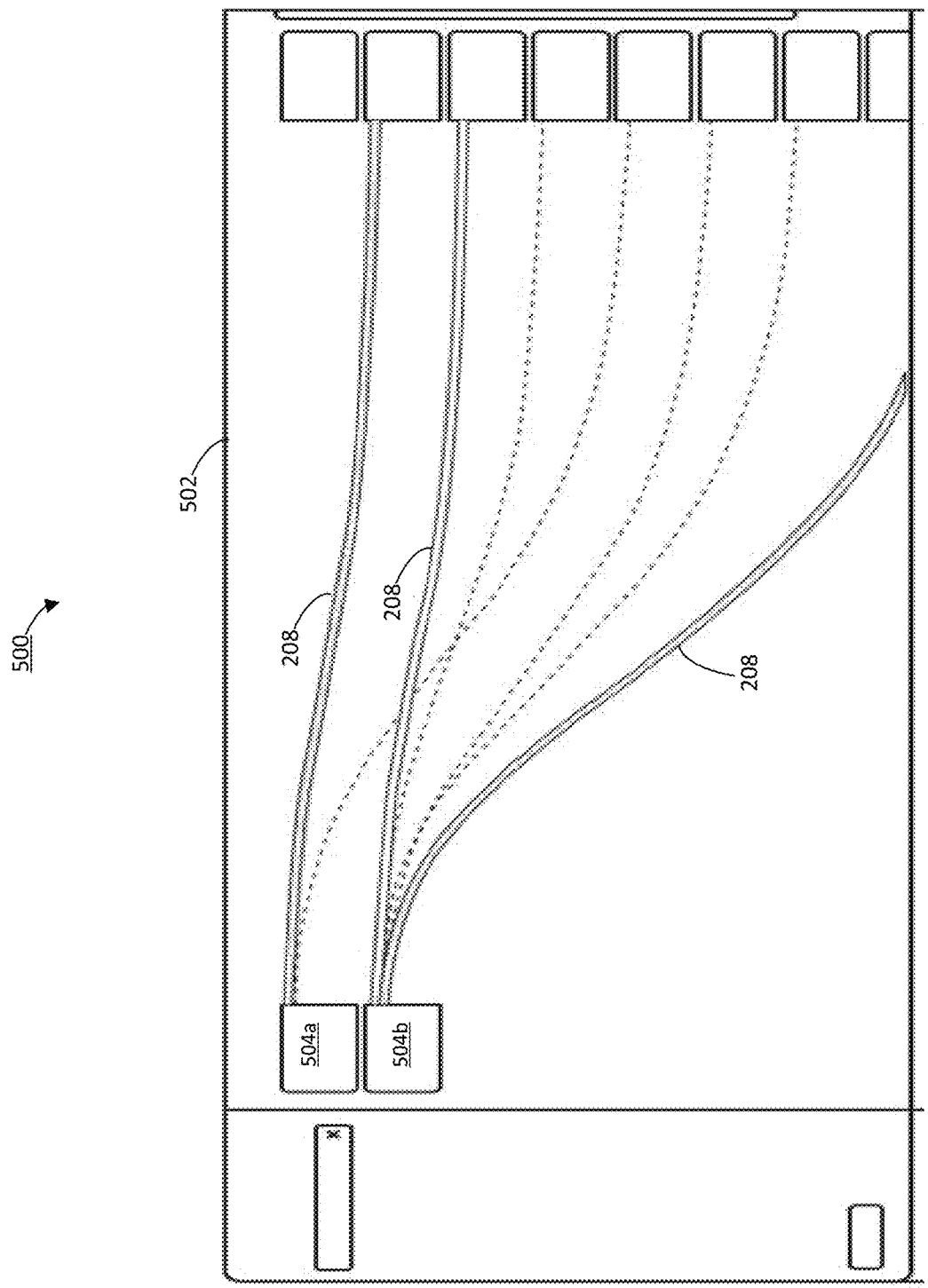
FIG. 5 depicts another example interface in which a particular group of consumers is selected from the interface shown in FIG. 4, in accordance with an example embodiment.

Referring also to FIG. 5, another example interface 500 defines a Sankey view 502 that represents a portion of the logical view 402. The logical view 502 shows the connections from a first and second group of consumers 504a and 504b, respectively. In various examples, the user can select groups of consumers or providers. The selections can be made via pull down menu or other actuation defined by the interfaces. For example, responsive to the groups 504a and 504b being selected via the interface 400, the connections that involve the groups are presented in bold via the interface, in particular the view 502. In some cases, responsive to the groups being selected via the interface, only the connections that involve the selected group of system elements are presented via the interface 300, such that no other connections are displayed.

As described herein, the example views define domain agnostic views of distributed systems. Such views can include system elements, connections between system elements, usage information associated with connections and operations, and the like. Further, such views are configured to be displayed on mobile devices or other devices having limited display sizes. The views can be filtered by user selections, so that particular connections or system elements are displayed. Further, a user selection in on view can be applied to other views. Various information can be encoded in the connected system elements that are displayed, such as, for example and without limitation, types of connections, usage information between system elements, frequency intensity, age, statuses (e.g., connected, disconnected), elapsed time since a disconnection, throughput, and states (e.g., different states of normal, different states of abnormal). Without being bound by theory, the views and information displays described herein can define a reusable interaction paradigm for various distributed systems across various domains, which can result in reduced training for operators. Further, the information and views described herein can enable operators to efficiently understand various properties of a distributed system, such as its current status or the root cause of a problem. By doing so, the information and views described herein can also enable operators using limited display sizes to initiate effective responses to various problems in an effective manner, for a variety of distributed systems.

In particular, for example, as described herein, a distributed control system can include a production network configured to perform automated control operations. The production network can include one or more data extraction nodes and a plurality of devices in communication with the data extraction nodes. The data extraction nodes can be configured to collect data from the plurality of devices, the data indicating connection information associated with the plurality of devices. The system can further include a screen configured to display a plurality of interfaces that include the plurality of devices represented as consumers and providers. The system can further include a processor a memory storing instructions that, when executed by the processor, cause the processor to encode the connection information so as to define encoded connection information that indicates one or more properties associated with connections defined between respective providers and respective consumers. The screen is further configured to display the encoded connection information between respective consumers and providers. In some cases, as shown herein, the screen is further configured to display the encoded connection information as lines that connect providers with consumers that are associated with respective encoded connection information.

In an example, each line defines a thickness that indicates a number of connections between consumers and providers coupled together with the respective line. Each line can define a hue that indicates a frequency in which one or more skills are used by a consumer coupled to the respective line. By way of further example, each line can define a color that indicates a state of a respective transfer between one or more consumers and one or more providers coupled together with the respective line. Additionally, or alternatively, each line can define a movement or shading gradient that defines a frequency. The frequency of the movement or color shading gradient can indicate a size of a respective transfer between one or more consumers and one or more providers coupled together with the respective line. By way of yet another example, each line can define a segmentation pattern that defines a length. The length of the segmentation pattern can indicate a connection time of a respective connection between one or more consumers and one or more providers coupled together with the respective line.

In some examples, the distributed control system includes a screen that defines a single desktop monitor or a mobile device display. In various examples, responsive to a user actuation, the processor of the system can group a set of consumers together so as to define a grouped system element. The screen can be configured to display the encoded connection information between respective providers and the grouped system element. Alternatively, or additionally, the processor can be configured to group a set of providers together so as to define a grouped system element, responsive to a user actuation, such as a user making a selection from a drop down menu. The screen can be further configured to display the encoded connection information between respective consumers and the grouped system element. As described herein, the plurality of interfaces can each define a plurality of different views (e.g., logical, Sankey, timeline, etc.), and the screen can be configured to display the plurality of views at the same time. Responsive to a user selection in a first view of the plurality of views, the screen can change the display in a second view of the plurality of views, such that the first and second views are dependent on each other.

Figure 7:
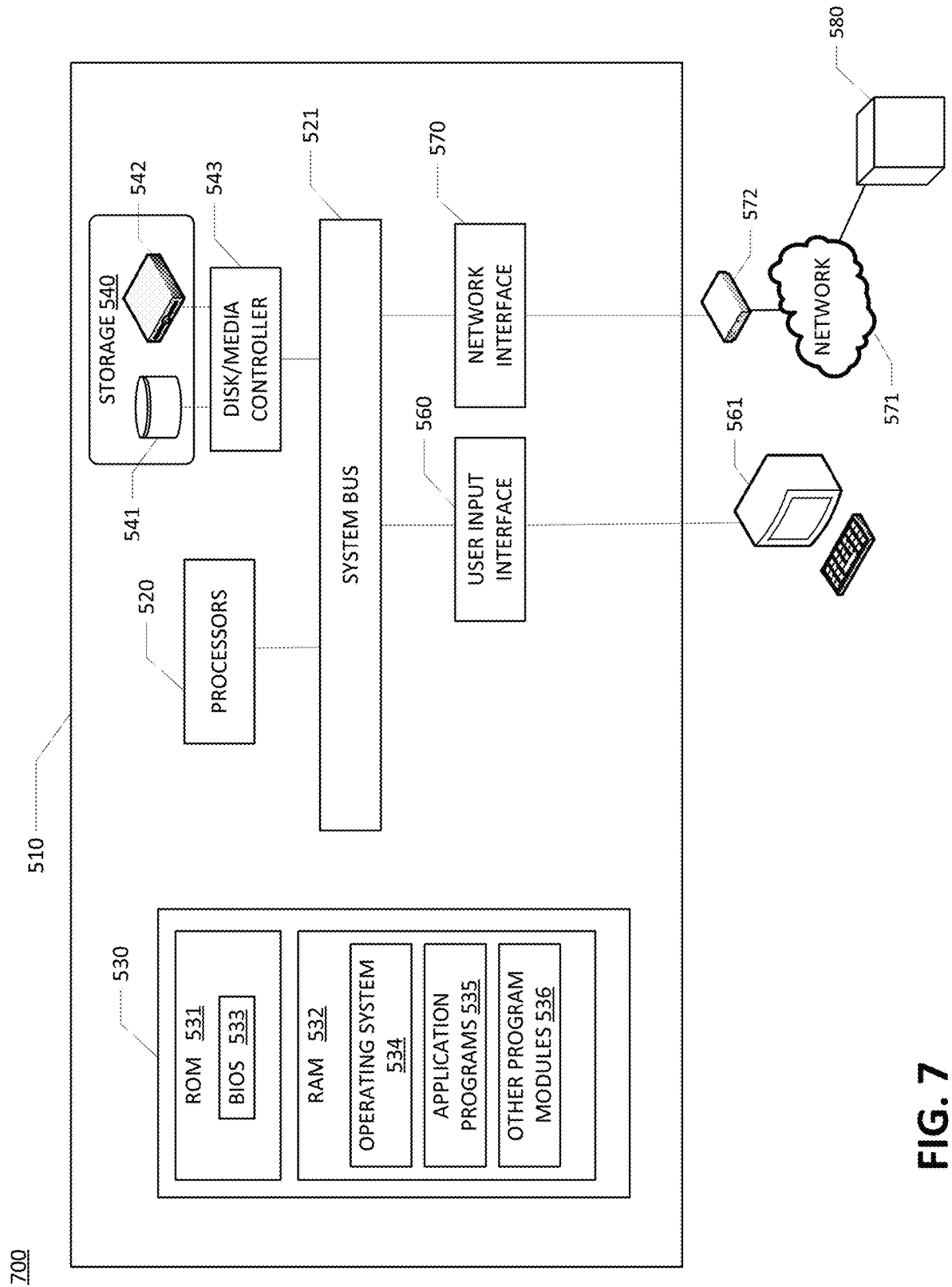
FIG. 7 illustrates a computing environment within which embodiments of the disclosure may be implemented.

FIG. 7 illustrates an example of a computing environment within which embodiments of the present disclosure may be implemented. A computing environment 700 includes a computer system 510 that may include a communication mechanism such as a system bus 521 or other communication mechanism for communicating information within the computer system 510. The computer system 510 further includes one or more processors 520 coupled with the system bus 521 for processing the information. The robot device 104 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 7, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542.

The magnetic hard disk 541 (or solid state drive) and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 700 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 7 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Without being bound by theory, it is recognized herein that generating models that focus on a specific user and/or role, in accordance with various embodiments, can enhance security capabilities as compared to generic anomaly detection models, such as models that focus on users in a corporate network. For example, such focused models can be used to detect security and/or safety events that might not otherwise be identified.

What is claimed is:

1. A distributed control system comprising:
    a production network configured to perform automated control operations, the production network comprising one or more data extraction nodes and a plurality of devices in communication with the data extraction nodes, the data extraction nodes configured to collect data from the plurality of devices, the data indicating connection information associated with the plurality of devices;
    a screen configured to display a plurality of interfaces that include the plurality of devices represented as consumers and providers;
    a processor; and
    a memory storing instructions that, when executed by the processor, cause the processor to encode the connection information so as to define encoded connection information that indicates one or more properties associated with connections defined between respective providers and respective consumers,
    wherein the screen is further configured to display the encoded connection information between respective consumers and providers,
    wherein the memory storing further instructions that, when executed by, cause the processor to:
    responsive to a user actuation, group a set of consumers together so as to define a grouped system element,
    wherein the screen is further configured to display the encoded connection information between respective providers and the grouped system element.

2. The distributed control system as recited in claim 1, wherein the screen is further configured to display the encoded connection information as lines that connect providers with consumers that are associated with respective encoded connection information.

3. The distributed control system as recited in claim 2, wherein each line defines a thickness, the thickness indicating a number of connections between consumers and providers coupled together with the respective line.

4. The distributed control system as recited in claim 2, wherein each line defines a hue, the hue indicating a frequency in which one or more skills are used by a consumer coupled to the respective line.

5. The distributed control system as recited in claim 2, wherein each line defines a color, the color indicating a state of a respective transfer between one or more consumers and one or more providers coupled together with the respective line.

6. The distributed control system as recited in claim 2, wherein each line defines a movement or shading gradient that defines a frequency, the frequency of the movement or color shading gradient indicating a size of a respective transfer between one or more consumers and one or more providers coupled together with the respective line.

7. The distributed control system as recited in claim 2, wherein each line defines a segmentation pattern that defines a length, the length of the segmentation pattern indicating a connection time of a respective connection between one or more consumers and one or more providers coupled together with the respective line.

8. The distributed control system as recited in claim 1, wherein the screen defines a single desktop monitor or a mobile device display.

9. The distributed control system as recited in claim 1, the memory further storing instructions that, when executed by the processor, cause the processor to:
    responsive to a user actuation, group a set of providers together so as to define a grouped system element,
    wherein the screen is further configured to display the encoded connection information between respective consumers and the grouped system element.

10. The distributed control system of claim 1, wherein the plurality of interfaces each define a plurality of views, and wherein the screen is further configured:
    display the plurality of views at the same time; and
    responsive to a user selection in a first view of the plurality of views, change the display in a second view of the plurality of views, such that the first and second views are dependent on each other.

11. A method performed in a distributed control system, the method comprising:
    collecting data from a plurality of devices within the distributed control system, the data indicating connection information associated with the plurality of devices;
    displaying a plurality of interfaces that include the plurality of devices represented as consumers and providers;
    encoding the connection information so as to define encoded connection information that indicates one or more properties associated with connections defined between respective providers and respective consumers; and displaying the encoded connection information between respective consumers and providers, wherein the method further comprising:

responsive to a user actuation, grouping a set of consumers together so as to define a grouped system element; and displaying the encoded connection information between respective providers and the grouped system element.

12. The method as recited in claim 11, the method further comprising:

displaying the encoded connection information as lines that connect providers with consumers that are associated with respective encoded connection information.

13. The method as recited in claim 12, wherein each line defines a thickness, the thickness indicating a number of connections between consumers and providers coupled together with the respective line.

14. The method as recited in claim 12, wherein each line defines a hue, the hue indicating a frequency in which one or more skills are used by a consumer coupled to the respective line.

15. The method as recited in claim 12, wherein each line defines a color, the color indicating a state of a respective transfer between one or more consumers and one or more providers coupled together with the respective line.

16. The method as recited in claim 12, wherein each line defines a movement or shading gradient that defines a frequency, the frequency of the movement or color shading gradient indicating a size of a respective transfer between one or more consumers and one or more providers coupled together with the respective line.

17. The method as recited in claim 11, wherein each line defines a segmentation pattern that defines a length, the length of the segmentation pattern indicating a connection time of a respective connection between one or more consumers and one or more providers coupled together with the respective line.

18. The method as recited in claim 11, wherein the plurality of interfaces each define a plurality of views, the method further comprising:

displaying the plurality of views at the same time; and responsive to a user selection in a first view of the plurality of views, changing the display in a second view of the plurality of views, such that the first and second views are dependent on each other.

\* \* \* \* \*